UNITED STATES PATENT OFFICE.

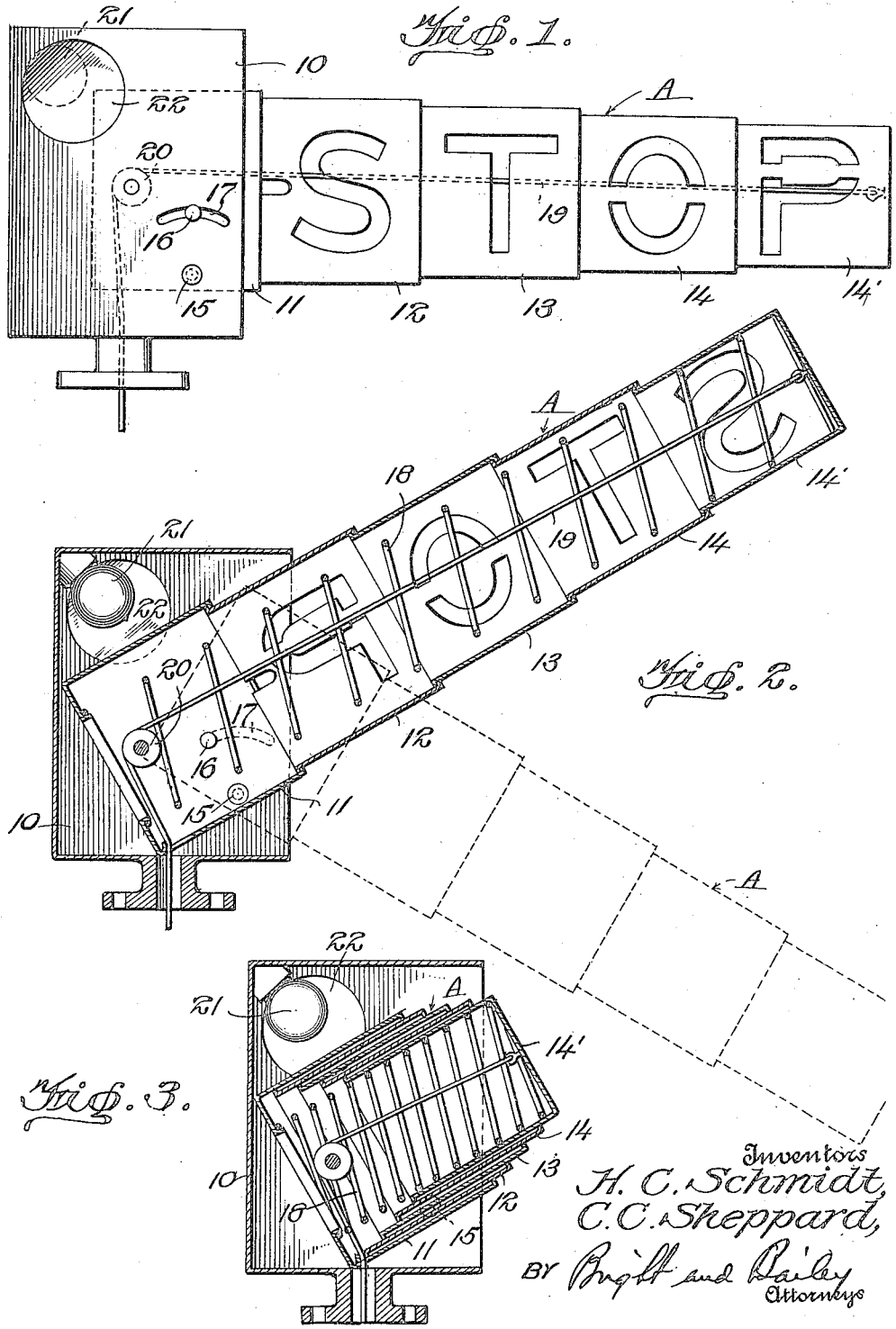

HERMAN C. SCHMIDT AND CREEDY C. SHEPPARD, OF WASHINGTON, DISTRICT OF COLUMBIA.

SIGNALING DEVICE.

1,403,267.   Specification of Letters Patent.   Patented Jan. 10, 1922.

Application filed September 7, 1921. Serial No. 499,113.

*To all whom it may concern:*

Be it known that we, HERMAN C. SCHMIDT and CREEDY C. SHEPPARD, citizens of the United States, and residents of Washington, in the District of Columbia, have invented certain new and useful Improvements in Signaling Devices, of which the following is a specification.

Our invention relates to signaling devices and while the same is capable of incorporation in various types of signals it is particularly adapted for use in connection with vehicles to indicate the intent of the driver.

Our purpose is to provide a device of this character which can easily be associated with a vehicle and particularly a motor vehicle so as to be visible when set to the three parties directly concerned with the movement of the vehicle, namely; the vehicle following, the traffic officer ahead, and the driver of the vehicle carrying the signaling device. To this end our device is designed to be mounted on the front fender or windshield bracket where it can be combined with a driving mirror.

It may be placed on the rear fender where it may be combined with a parking light.

It is also our purpose to provide a vehicle signaling device of this type which will be neat in appearance, positive and effective in action, and which will be inexpensive to manufacture.

In the drawings chosen to illustrate our invention, the scope of which is pointed out in the appended claims.

Figure 1 is a side elevation of our signaling device, the same being shown projected and in horizontal position;

Fig. 2, a vertical section of the device with the semaphore arm shown in full lines at the limit of its upward movement and in dotted lines at the limit of its downward movement; and Fig. 3, a vertical section of the device showing the semaphore arm retracted.

In the embodiment of our invention illustrated in the drawings 10 indicates the supporting casing of the device in which is pivoted one end of a projectile and retractable semaphore arm A. This semaphore arm is composed of a plurality of tubular telescoping members 11, 12, 13 and 14 and 14' the member 11 being directly pivoted to the casing 10 at 15. The pivotal movement of the member 11 with respect to the casing 10 is limited by means of pins 16 carried by the member 11 which engage in slots 17 formed in the casing 10 and disposed concentric with respect to the pivot 15. Disposed within the members 11, 12, 13, 14, and 14' is a spring 18 one end of which operates against the member 14' and the other end against the member 11 and therefore constantly tends to hold the sections or members of the semaphore arm projected. In order to control the pivotal position of the semaphore arm A and the projection and retraction of the sections of said arm we provide a cord or cable 19 which is connected at one end to the member 14' and is then trained over a pulley 20 carried by the member 11 and thence trained in any suitable manner to the dash of the car or vehicle so that the driver may suitably control the positioning of the arm A and the projection and retraction of the sections of said arm. The casing 10 is provided with a suitable light 21 which serves to illuminate the interiors of the members 11, 12, 13 and 14'. Suitable perforations on the sides of the members constituting the semaphore arm may be employed if desired to designate any desired symbol. We also show the casing 10 provided with a colored window 22 which may be utilized as a parking light.

It will be evident that when the tension on the cord 19 is released the arm A will be projected by the spring 18 and will be moved to a desired signaling position under the influence of gravity. It will of course be obvious that the extent of movement of the arm A under the influence of gravity from its uppermost position can be readily controlled through the medium of the cord or cable 19. It will also be obvious that as the strength of the spring 18 is greater than the weight of the arm A the cord 19 can be operated to pivot the arm upwardly without causing any retraction of the sections composing the arm, such retraction only being possible after the arm A has been swung through the medium of the cord 19 to the limit of its upward pivotal movement. Likewise, no downward pivotal movement of the arm A can take place until the sections composing the arm are fully projected by the spring 18. The pivotal movement of the arm A is such that it can partake of three positions to indicate various directions which the vehicle wishes to take, as for instance the position of the semaphore arm shown in full lines in Fig. 2 may indicate intention to turn to the right, while horizontal position as shown in Fig. 1 may indicate an intention to stop and a position below the horizontal as shown in dotted lines in Fig. 2 may indicate an intention to turn to the left. It will of course be obvious that these conditions can be varied according to the particular circumstances to be met.

While we have illustrated and described one particular form of carrying our invention into practice it will be apparent that the same is susceptible to changes in arrangement and proportions and to desirable additions with the exercise of only ordinary mechanical skill and without departing from the scope of the appended claims.

We claim:—

1. In a signaling device, the combination of a projectile and retractable semaphore arm composed of a series of telescoping sections, spring means constantly tending to project said sections, and means for retracting said sections against the influence of said spring means.

2. In a signaling device, the combination of a projectile and retractable semaphore arm composed of a series of tubular telescoping sections, spring means within said sections constantly tending to project the same, and means for retracting said sections against the influence of said spring means.

3. In a signaling device, the combination of a support, a projectile and retractable semaphore arm movably connected to the support and composed of a series of telescoping sections, spring means constantly tending to project said sections, means for retracting said sections against the influence of said spring means, and means for moving the arm relative to the support whereby said arm may be set in a plurality of signaling positions.

4. In a signaling device, the combination of a support, a projectile and retractable semaphore arm pivotally connected to the support and composed of a series of telescoping sections, spring means constantly tending to project said sections, means for retracting said sections against the influence of said spring means, and means for pivoting the arm relative to the support whereby said arm may be set in a plurality of signaling positions.

5. In a signaling device, the combination of a support, a projectile and retractable semaphore arm pivotally connected to the support and composed of a series of telescoping sections, spring means constantly tending to project said sections, means for retracting said sections against the influence of said spring means, means for pivoting the arm relative to the support whereby said arm may be set in a plurality of signaling positions, and a pin and slot connection between the arm and support for limiting the pivotal movement of said arm with respect to the support.

6. In a signaling device, the combination of a support, a projectile and retractable semaphore arm pivotally connected to the support for limited vertical swinging movement and operable from its uppermost position to its lowermost position by gravity, spring means constantly tending to project said sections, and means for controlling the gravity induced movement of the arm and for raising the arm to its uppermost position, said means being operable when the arm is in its uppermost position to retract said sections against the influence of said spring means.

In testimony whereof we hereunto affix our signatures.

HERMAN C. SCHMIDT.
CREEDY C. SHEPPARD.